Jan. 3, 1939.    H. S. McLAREN    2,142,325
ROTARY VALVE INTERNAL COMBUSTION ENGINE
Filed Oct. 11, 1937    2 Sheets-Sheet 1
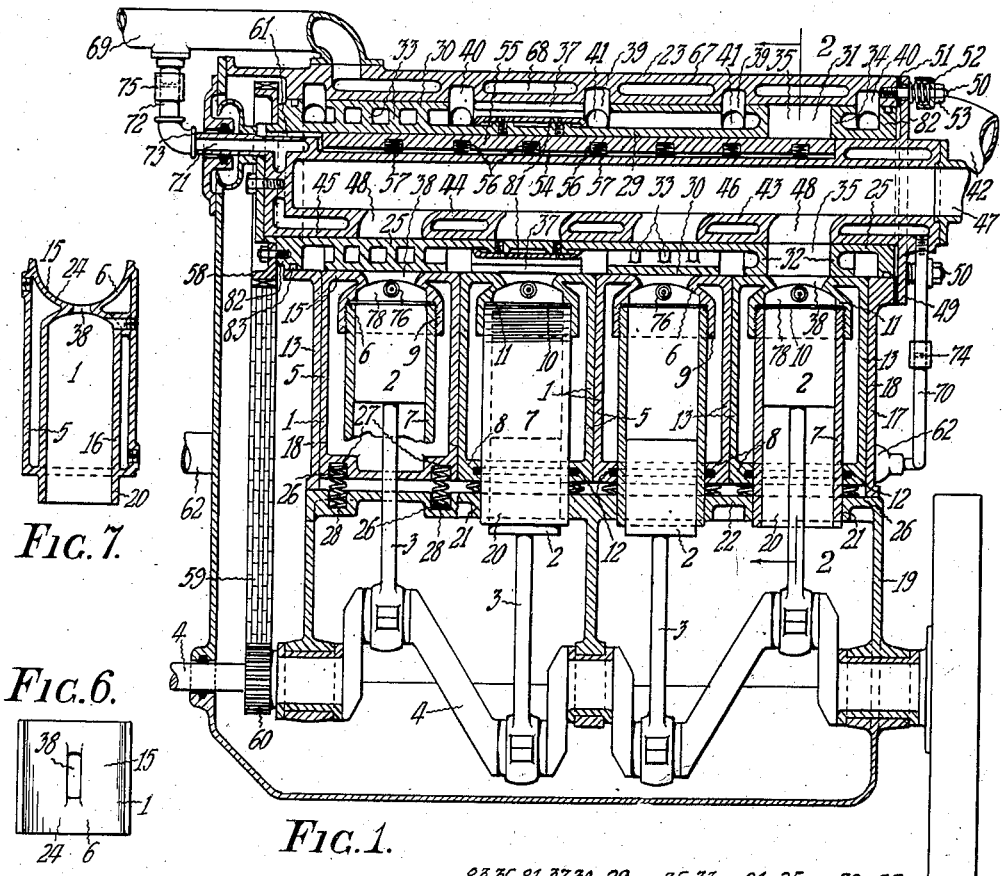
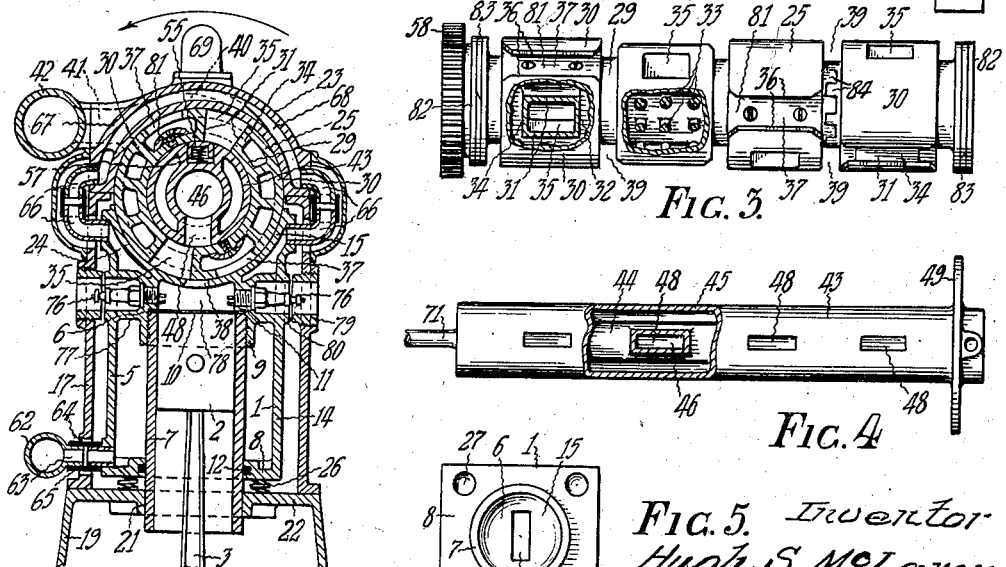

Inventor
Hugh S. McLaren

Patented Jan. 3, 1939

2,142,325

UNITED STATES PATENT OFFICE 2,142,325

ROTARY VALVE INTERNAL COMBUSTION ENGINE

Hugh Stanley McLaren, North Brighton, Victoria, Australia

Application October 11, 1937, Serial No. 168,451
In Australia June 22, 1937

11 Claims. (Cl. 123—59)

This invention relates to an internal combustion engine having separate cylinder units and a hollow rotary valve with inlet and exhaust ports to control the cyclical operations in the cylinder units.

An object of the invention is to prevent flow of exhaust gases through the inlet ports of the rotary valve into the intake system or manifold, such penetration of exhaust gases from cylinders of earlier cyclical sequence into the intake system being apt to so reduce the velocity therein that the carburant or fuel fails to issue from the jets or like supply devices in sufficient quantity to maintain combustion in cylinders of later cyclical sequence with consequent miss-firing and stoppage of the engine, particularly at low speeds. This object of the invention is attained by maintaining both ends of the inlet ports of the hollow rotary closely sealed during all periods of the cyclical operations of the engine with the exception of the induction periods. The sealing of the inner ends of the inlet ports is effected by mounting a tubular intake or inlet manifold within the hollow rotary valve in such a manner that it is non-rotatable within the same but is free to float or move transversely therein, and by resiliently maintaining the transversely movable tubular intake or inlet manifold in contact with the inner surface of the hollow rotary valve. The closing of the outer ends of the inlet ports is effected by forming concave bearing surfaces or seatings on the ends of the separate cylinder units, and by impressing the concave bearing surfaces upon the outer surface of the hollow rotary valve.

Another object of the invention is to so construct the concave bearing surfaces or seatings on the cylinder units that they will completely isolate the exhaust ports from the inlet ports of the hollow rotary valve.

A further object of the invention is to provide for free discharge of the products of combustion by the provision of an exhaust space or chamber within the rotary valve which is common to the exhaust ports of the same and is associated with a plurality of outlets all of which participate simultaneously in each exhaust discharge from the cylinder units.

Yet another object of the invention is to provide means for cooling the hollow rotary valve internally and externally, and means for cooling the cylinder units and the concave bearing surfaces thereon, the cooling means being adapted for the use of either water or air as the cooling medium. The internal cooling means of the hollow rotary valve is constructed to include a tubular intake or inlet manifold which is maintained at a moderate temperature by the cooling medium.

Lastly, the invention provides lubricating means adapted to supply lubricant to the interior of the hollow rotary valve for centrifugal distribution to the external surface of the same and to the cylinder units.

The invention will be better understood from the description of the embodiments of the same illustrated in the accompanying drawings wherein:—

Figure 1 is a longitudinal section of an internal combustion engine according to the invention.

Figure 2 is a part transverse section on the line 2—2 in Figure 1.

Figure 3 is a side elevation partly in section of a rotary valve.

Figure 4 is an inverted plan partly in section of a combined inlet manifold and internal cooling member of the rotary valve.

Figure 5 is an inverted plan on a smaller scale of one of the cylinders shown in Figure 1.

Figure 6 is a plan of the combustion head of the cylinder shown in Figure 5.

Figure 7 is a transverse section of a modified cylinder unit according to the invention.

Figure 9:
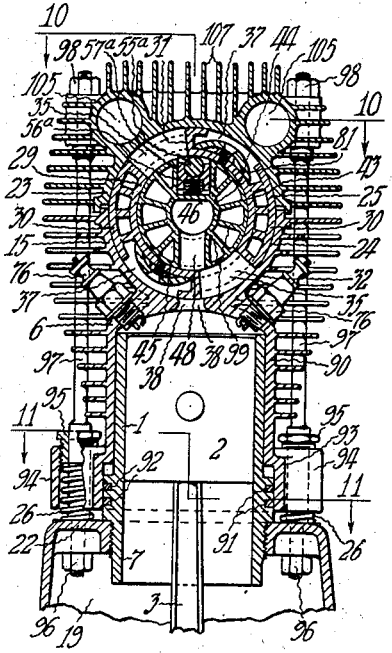
Figure 9 is a part transverse section on the line 9—9 in Figure 8.

In these views, the numerals 1, 2, 3 and 4 indicate respectively the cylinder units, the pistons, the connecting rods and the crankshaft of an internal combustion engine.

The cylinder units 1 comprise jackets 5, combustion heads 6 formed integrally with the jackets, and liners or barrels 7 which form the cylinders proper wherein the pistons 2 reciprocate. Inward extensions 8 formed at the lower ends of the jackets 5 are bored to receive the liners 7 which at their upper ends are screwed tightly into sockets 9 on the combustion heads 6, packing rings 10 being interposed between the ends of the liners 7 and shoulders 11 to prevent leakage. The liners 7 project somewhat below the bored extensions 8, and the spaces between the sides of the liners and the jackets 5 are adapted for circulation of water, leakage of which is prevented by packings 12 fitted in grooves in the extensions 8.

The jackets 5 and the combustion heads 6 are of rectangular shape or section, see Figures 5 and 6, and the opposed pairs of walls 13 and 14 of the jackets are parallel and of equal width. It will be obvious that if the walls 13 and 14 be all of the same width, the jackets 5 and the combustion heads 6 will be of square shape or outline.

The upper walls 15 of the combustion heads 6 are partially annular in section, and as a consequence of the rectangular shape of the combustion heads 6 the upper surfaces of the walls 15 are of concave segmental cylindrical formation, see particularly Figures 6 and 7.

The cylinder units 1 instead of being fitted with liners 7 as described, may have cylinders 16 formed integrally with the combustion heads 6 and the jackets 5 and extended downwardly from the latter, see Figure 7.

A plurality of cylinder units 1 having liners 7 or integral cylinders 16 as described, are mounted side by side in a row in a casing 17 with the adjoining jacket walls 13 in contact and with the walls 13 of the cylinder units at opposite ends of the row in contact with the end walls 18 of the casing. In the embodiment illustrated in Figure 1 four cylinder units 1 are shown, but any number of such units greater or less than four may be used, if so desired.

The casing 17 is mounted upon and secured to a crank chamber 19 of usual construction in which the crankshaft 4 is rotatably supported, and the projecting ends 20 of the liners 7, or of the cylinders 16, are slidably fitted in circular apertures 21 formed in the upper side 22 of the crank chamber 19.

Detachably fixed to the upper end of the casing 17 is a cover 23 the inner surface of which is of segmental cylindrical formation and is opposed to the segmental cylindrical concavities referenced 24 on the combustion heads 6. The inner surface of the cover 23 and the segmental cylindrical concavities 24 are accurately constructed to the same radius, and a cylindrical rotary valve 25 is fitted between the cover 23 and the concavities 24 which together form a bearing wherein the rotary valve 25 revolves.

The segmental cylindrical concavities 24 on the combustion heads 6 are urged continuously into gas-tight contact with the periphery of the rotary valve 25 as the same rotates, by springs 26 which exert upward pressure upon the cylinder units 1 and are mounted in aligned pockets 27 and 28 formed respectively in the undersides of the jacket inward extensions 8 and in the upper side of the crank chamber 19.

The cylinder units 1 being free to move upwardly by reason of the slidable mounting of the liner ends 20 in the apertures 21 exert an upward thrust under action of the springs 26 upon the rotary valve 25 which is thus maintained in contact with the underside of the cover 23. The cylinder units are supported at their lower ends by the springs 26 and at their upper ends by the seating of the bearing surfaces or concavities 24 upon the rotary valve 25, while the walls 14 of the jackets 5 are spaced from the casing 17. As a consequence of the absence of constraint by the casing 17 upon the jacket walls 14, a free and accurate seating of the concavities 24 upon the rotary valve 25 is ensured and the frictional resistance opposing the springs 26 is considerably reduced.

The rotary valve 25 has a cylindrical body or barrel 29 and longitudinally spaced pairs of arcuate sections or slides 30 which are integrally united with the body or barrel 29 by radial walls 31 and 32 and by pluralities of bridging pieces or struts 33. The spacing of the pairs of arcuate sections or slides 30 corresponds with the spacing of the cylinder units 1 and a pair of diametrically opposed sections or slides 30 are provided for each of the cylinder units.

The radial walls 31 and 32 form conduits 34 the interiors of which form inlet passages or ports 35 which extend from the peripheries of the arcuate sections 30 to the interior of the valve body 29. The openings or spaces between the longitudinal edges 36 of the arcuate sections form exhaust ports 37 which lead into the space between the arcuate sections 30 and the cylindrical body 29, this space being common to all of the exhaust ports 37 of the arcuate sections.

Formed in the combustion head of each cylinder unit 1 and extending between the concave bearing surfaces 24 thereon and the interior of the cylinder unit is a service port 38 through which the rotary valve 25 controls the admission of combustible mixture and the discharge of exhaust gases by means of the circumferentially alternating inlet ports 35 and exhaust ports 37.

Peripheral spaces 39 separate the adjoining pairs of arcuate sections or slides 30 and register continuously with tangentially disposed channels 40 formed in the inner periphery of the cover 23 and connected by outlets 41 with an exhaust manifold 42.

Fitted within the interior of the cylindrical valve body 29 is an elongated tubular casing 43 having an inner wall 44 and a concentrically related outer wall 45.

The space between the walls 44 and 45 is utilized for circulation of water whereby the interior of the rotary valve 25 is maintained cool, while the space within the inner wall 44 forms a central water-jacketed inlet passage 46 which is connected by a tubular extension 47 with a source of combustible mixture, such as a carburettor or the like.

Extending between the inner wall 44 and the outer wall 45 of the tubular casing 43 are branch passages 48 which connect with the central inlet passage 46 and are located in alinement with the service ports 38 but are separated from the same by the arcuate slides 30 and the valve body 29 except during induction periods of the engine cycle when the said service ports and branch passages are associated by the inlet ports 35.

Formed integrally with the tubular casing 43 is a flange 49 and studs 50 extended through the flange 49 into the cover 23 and the casing 17 maintain the tubular casing 43 in fixed position as the cylindrical valve body 29 revolves about the wall 45. Yieldable packing 51 is inserted between the flange 49 and the ends of the cover 23 and casing 17. Springs 52 tensioned by nuts 53 bear upon the flange 49, and adjusted pressure thus exerted upon the flange while sufficient to maintain a joint between the same and the cover 23 and casing 17 permits the tubular casing 43 to float or move transversely within the cylindrical valve body 29.

Formed in the tubular casing 43 oppositely to the branch passages 48 is a longitudinal recess 54 wherein is freely fitted a pressure bar 55 having therein pockets 56 accommodating springs 57 which bed the pressure bar 55 upon the inner surface of the valve body 29 and exert pressure upon the base of the recess 54 and accordingly upon the floating casing 43.

The transverse pressure thus applied to the floating casing causes the portion of the same wherein are formed the branch passages 48 to bear upon the inner surface of the valve body 39.

The contact, so obtained, of the casing 43 with the inner surface of the valve body 29 seals the outer ends of the branch passages 48 and the inner ends of the inlet ports 35; while the resiliently impressed contact of the concave bearing surfaces 24 with the peripheral surfaces of the arcuate slides 30 seals the outer ends of the said inlet ports. Accordingly, it will be understood that the sealing of the branch passages 48 and the double sealing of the inlet ports 35, except during induction periods, effectively prevents penetration of the products of combustion into the inlet passage 46 and obviates the consequent reduction of velocity therein and the adulteration of the combustible mixture by exhaust gases, which hitherto have made the operation of engines fitted with rotary valves not entirely satisfactory particularly at slow speeds.

The rotary valve 25 is operatively associated with the crankshaft 4 by suitable transmission means, which in the engine illustrated consists of a sprocket 58 fixed to the rotary valve and connected by a chain 59 with a sprocket 60 secured to the crankshaft 4.

It is necessary in order to efficiently lubricate the rotary valve 25 that lubricating oil should be supplied to its interior, as the oil is then fed centrifugally to the inner surface of the valve body 29 and through the inlet ports 35 to the peripheries of the arcuate sections 30. Moreover, oil thus fed through the inlet ports 35 also passes through the service ports 38 and lubricates the cylinder units 1.

For the purpose of thus lubricating the rotary valve and the cylinder units, the longitudinal recess 54 is utilized as a container for lubricating oil which is carried in sufficient quantity from the crank chamber 19 by the chain 59 and enters the recess 54 by way of a groove 61 formed in the upper side of the casing 43. Oil thus supplied to the recess 54 is spread uniformly by the pressure bar 55 over the inner surface of the valve body 29 as the same rotates, and the oil is fed through the inlet ports 35 to the peripheries of the arcuate sections 30 and the interiors of the cylinder units.

Water for cooling the cylinder units 1 and the rotary valve 25 is supplied from a manifold 62 and enters the cylinder units by branches 63 which extend through apertures 64 in the wall 14. The branches 63 have flexible connections 65 and the apertures 64 are elongated so that movement of the cylinder units 1 will not be impeded by the branches 63. Water supplied by the branches 63 flows upwardly between the jackets 5 and the liners 7 to the water spaces in the combustion heads 6 and effectively cools the walls 15 whereon are formed the concave bearing surfaces 24.

From the upper ends of the cylinder units 1 the water passes through flexibly connected elbow tubes 66 into opposite sides of the cover 23 which has a jacket wall 67 to provide a circulating space 68 to cool the outer surface of the rotary valve 25. Water is discharged from the circulating space 68 through an outflow tube 69 to a radiator (not shown) or like cooling means.

A tube 70 connects the water supply manifold 62 with the water circulating space between the walls 44 and 45 of the tubular casing 43 through which the water flows and is discharged through pipes 71 and 72 to the outflow tube 69. The pipe 71 extends through suitable sealing means 73 which prevents leakage of oil carried up by the chain 59 and is so constructed that it will not obstruct the movement of the floating casing 43 by the springs 57. Furthermore, flexible connections 74 and 75 are provided in the tube 70 and the pipe 72 to permit movement of the casing 43 in the valve body 29.

It will be apparent that the rotary valve 25 is adequately cooled externally by the water-jacketed combustion heads 6 and cover 23 and internally by the water circulating casing 43. Moreover, the flow of water about the inlet manifold 46 and the branch passages 48 ensures that the temperature of the combustible mixture entering the cylinder units 1 will be maintained within moderate limits.

For the purpose of igniting the combustible mixture compressed by the pistons 2 in the cylinder units 1, spark plugs 76 are mounted in pockets 77 in the combustion heads 6 and project into the combustion chambers 78. Bushes 79 screwed into the casing 17 afford access to the spark plugs 76, and the inner ends of the bushes 79 closely adjoin but are clear of bosses 80 on the jacket walls 14. The bushes 79 contact with the bosses 80 and form guides for the cylinder units 1 if the bearing surfaces 24 should through any cause become unduly separated from the rotary valve 25.

In operation, it will be observed on reference to Figure 2, that as the rotary valve 25 rotates in the direction indicated by an arrow, the inlet ports 35 and the exhaust ports 37 become alternately connected with the service port 38.

The pistons 2 and the rotary valve 25 are shown in Figure 1 in the positions they occupy at the commencement of a complete working cycle of the engine. The piston 2 in the cylinder unit 1 at the left hand end of the engine is about to start upon its working stroke and ignition of the compressed combustible mixture in the combustion chamber 78 is occurring at the spark plug 76. The service port 38 of the cylinder unit is sealed by a rigid strutted portion of an arcuate section 30 which is, accordingly, able to withstand without distortion the upward thrust of the combustion head 6 occurring at ignition. In the adjoining cylinder unit 1, an exhaust port 37 is associated with the service port 38 and the piston 2 is commencing its exhaust stroke during which the products of combustion are expelled into the space about the valve body 29 and are discharged through the spaces 39, channels 40 and outlets 41 into the manifold 42. It will be seen that all the spaces 39, channels 40 and outlets 41 participate simultaneously in the discharge, so that a very free exhaust is obtained. The next adjoining cylinder unit having been filled with combustible mixture through an inlet port, a strutted part of an arcuate section is closing the service port 38 and the piston 2 is starting upon its compression stroke. The piston 2 in the cylinder unit 1 at the right hand end of the engine is about to commence its induction stroke, the service port 38 being connected by an inlet port 35 with the branch passage 48 of the inlet manifold.

Referring again to Figure 2, it will be observed that an inlet port 35 has become connected with the branch passage 48 and is starting to register with the service port 38.

As the piston 2 proceeds on its suction stroke, the inlet port 35 firstly fully connects and then disconnects the service port 38 and the branch passage 48, the disconnection being timed to occur somewhat after the piston reaches the limit of its downward travel. Thereafter the strutted part of the arcuate section becomes interposed between and completely isolates the service port 38 from the branch passage 48 during the compression and power strokes of the piston 2. The exhaust port 37 at the rear of the strutted part of the arcuate section becomes connected with the service port 38 at a required point during the power stroke of the piston 2 and the exhaust port remains thus connected until the termination of the exhaust stroke of the piston, whereupon the opposed inlet port 35 becomes associated with the service port 38.

It will be apparent that as an arcuate section 30 and the exhaust port 37 trailing rearwardly of the section revolve past the service port 38, a complete cycle of operations corresponding to four strokes, viz., suction, compression, power and exhaust, of the piston 2 and two revolutions of the crank shaft 4, occurs in the cylinder unit. Moreover, it will be observed that another cycle of operations is performed during the passage of the opposed arcuate section and exhaust port over the service port 38. Consequently, two complete working cycles occur in the cylinder unit during each revolution of the rotary valve 25 and four revolutions of the crankshaft 4. Accordingly, the sprockets 58 and 60 are designed to rotate the rotary valve at one quarter of the speed of the crankshaft 4.

Two complete working cycles are performed in each of the other cylinder units during each revolution of the rotary valve 25, the arcuate sections of the latter and the associated inlet and exhaust ports being disposed in required positions to control the actions of the several pistons 2 in cyclical order. The pairs of arcuate sections 30 being similarly constructed and disposed in diametrically opposite positions, the rotary valve 25 may be dynamically balanced so that it will operate silently and without vibration.

The parts of the rotary valve body 29 directly facing the exhaust ports 37 may be protected against undue local heating by shields 81 constructed of a metal having a relatively high coefficient of heat conductivity to quickly disperse excess heat, and the ends of the rotary valve may be provided with grooved flanges 82 which are fitted with elastic rings 83 to prevent leakage of exhaust gases. Moreover, the rotary valve may have the several pairs of opposed arcuate sections 30 constructed separately and operatively connected together as by clutch teeth or dogs 84, see Figure 3.

Figure 8:
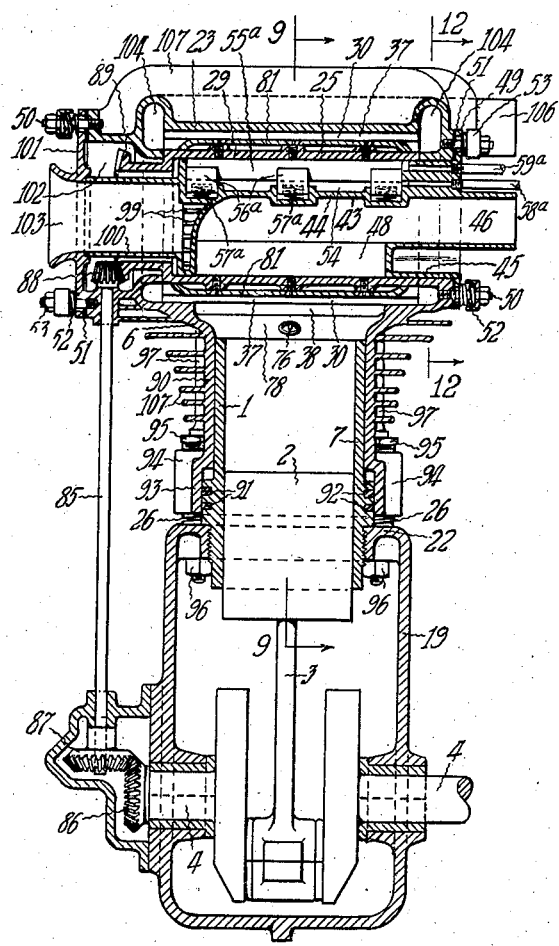
Figure 8 is a longitudinal section of an internal combustion engine according to the invention but modified for air cooling.
Figure 11:
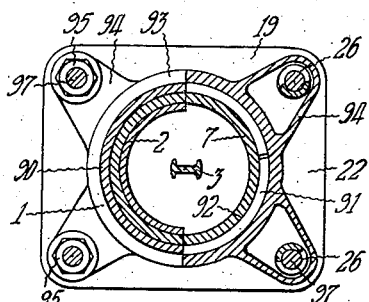
Figure 11 is a transverse horizontal section on the line 11—11 in Figure 9.
Figure 12:
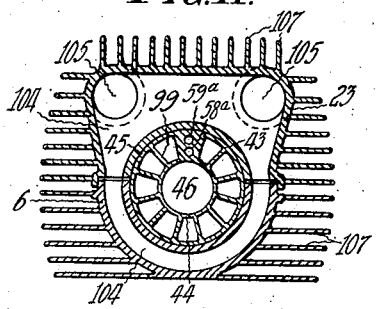
Figure 12 is a transverse section on the line 12—12 in Figure 8.
Figure 10:
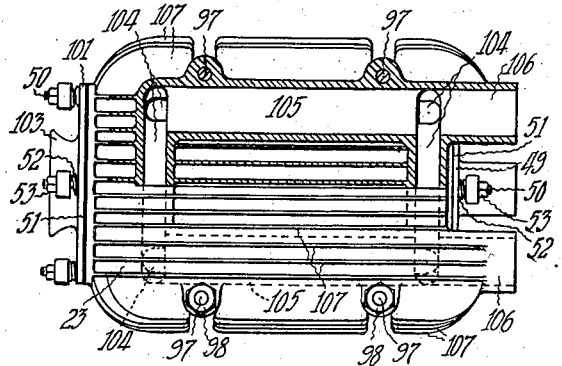
Figure 10 is a half plan and a half horizontal section on the line 10—10 in Figure 9.

In the engine illustrated in Figure 8, the rotary valve 25 is constructed and operates as previously described, but the cylinder unit 1, the combustion head 6, the tubular casing 43 and the cover 23 are appropriately modified for air cooling.

The rotary valve 25 is driven at one quarter crankshaft speed by a shaft 85 operatively connected with the crankshaft 4 by bevel gears 86 and 87 and with the rotary valve by bevel gears 88 and 89. The inlet ports 35 and the exhaust ports 37 make alternate connection with the service port 38 which is elongated to provide ample area for free induction and exhaust.

The cylinder proper or liner 7 is fixed securely as by screwing to the upper side 22 of the crank chamber 19, and the combustion head 6 is formed with an extension or sleeve 90 which slidably fits the exterior of the liner 7. Leakage of gases from within the combustion chamber 78 may be prevented by elastic rings 91 mounted in grooves 92 in the liner 7 and fitting the inner surface of an enlargement 93 at the lower end of the sleeve 90.

Formed integrally with the sleeve 90 are lugs or extensions 94 into which are screwed hollow plugs 95 by means of which the compression of springs 26 positioned between the plugs 95 and the top of the chamber 19 may be regulated.

Fixed to the chamber 19, as by nuts 96, are columns 97 which extend upwardly through the springs 26 and plugs 95 and are secured, as by nuts 98, to the cover 23 which is rigidly supported by the columns 97 and maintained by the same in spaced relation with the chamber 19.

The upper side of the combustion head 6 and the lower side of the cover 23 are of segmental cylindrical formation and form bearing surfaces between which the rotary valve 25 revolves as previously described.

It will be understood that the springs 26 exert pressure on the plugs 95 and thereby upon the lugs 94 to thrust the slidable sleeve 90 upwardly to seat the bearing surface 24 upon the rotary valve, while the bearing surface of the cover 23 forms an abutment opposing the upward pressure thus exerted upon the rotary valve.

A tubular casing 43 is mounted to float within the rotary valve 25 and is maintained in contact with the interior of the valve body 29 as previously described, but the space between the inner and outer walls of the casing forms a passage for a current of air and cooling ribs 99 extend between the walls and are integrally united with the same.

An extension 100 of the tubular casing 43 fits into a recess in a cover 101 on a chamber 102 which encases the gears 88 and 89, and a tapered intake 103 to direct air into the casing may be provided on the cover 101. The inlet passage 46 is maintained cool by the air current flowing through the tubular casing and it is connected with a source of combustible mixture, such as a carburettor or the like.

In lieu of the pressure bar 55 previously referred to, a roller 55ª may be rotatably mounted in the longitudinal recess 54 upon bearing shoes 56ª supported by springs 57ª which maintain the roller 55ª and the part of the floating casing 43 opposed to the recess 54 in contact with the interior of the rotary valve 25.

Lubricant is maintained at a constant level in the recess 54 by inflow and outflow pipes 58ª and 59ª connected with the lubricant circulating system of the engine. The roller 55ª is partially immersed in the lubricant contained in the longitudinal recess 54, and the roller in rotating feeds the lubricant to the inner surface of the valve body 29 from which the lubricant passes centrifugally through the inlet ports 35 to the peripheral surfaces of the arcuate sections 30 and through the service port 38 into the interior of the cylinder unit.

In the multi-cylinder engine previously described, the pressure bar 55 may be replaced by a roller carried by bearing shoes supported by springs, and the recess or lubricant container 54 may be connected with the lubricant circulating system of the engine by appropriate inflow and outflow connections.

The exhaust space surrounding the valve body 29 is associated with chambers 104 positioned adjacently to the opposite ends of the rotary valve 25 and formed partly in the combustion head 6 and partly in the valve cover 23.

Passages 105 formed longitudinally in the valve cover 23 associate the oppositely positioned chambers 104, and the passages 105 are provided with extensions 106 to which exhaust pipes may be connected.

The annular exhaust space between the valve body 29 and the arcuate sections 30 is completely open at its opposite ends to the chambers 104, so that a particularly free discharge of the products of combustion is provided by way of the annular exhaust space, the chambers 104 and the passages 105, which is a matter of considerable importance in an air cooled engine fitted with a rotary valve as described.

The combustion head 6 and the sleeve extension 90 thereof, as well as the cover 23 are provided with heat radiating fins or ribs 107 of usual construction to increase the efficiency of the air cooling.

An air cooled engine having a rotary valve and a single cylinder unit is illustrated and has been described, but it will be understood that a plurality of such air cooled cylinder units may be used and that they may be arranged in radial formation about a crankshaft. Moreover, it will be understood that the rotary valves controlling the cylinder units may be driven by shafts 85 operated by a common or master gear wheel fixed to the crankshaft.

What I claim is:

1. In an internal combustion engine, a hollow rotary valve to control the intake and exhaust of the engine, an induction conduit non-rotatably mounted within the hollow rotary valve and transversely movable in the same, intake passages extending from the induction conduit, inlet ports in the rotary valve registering with the intake passages as the said valve rotates, and resilient means bearing on the transversely movable induction conduit to maintain the portion of the said conduit wherein are the intake passages in contact with the inner surface of the hollow rotary valve.

2. In an internal combustion engine, a hollow rotary valve to control the intake and exhaust of the engine, a casing non-rotatably mounted within the hollow rotary valve and transversely movable in the same, an induction conduit within the casing, a space for circulation of a cooling medium between the casing and the induction conduit, intake passages disposed in line and extending from the induction conduit to the external surface of the casing, inlet ports formed radially in the hollow rotary valve and registering in cyclical order with the intake passages as the said valve rotates, and resilient means bearing on the transversely movable casing to maintain the portion of the external surface of said casing wherein are the outer ends of the intake passages in contact with the inner surface of the hollow rotary valve.

3. In an internal combustion engine, a hollow rotary valve to control the intake and exhaust of the engine, a casing non-rotatably mounted within the hollow rotary valve and transversely movable in the same, an induction conduit within the casing, intake passages disposed in line and extending from the induction conduit to the external surface of the casing, a recess in the casing positioned oppositely to the portion of said casing wherein are the intake passages, a movable abutment member in the recess, and springs interposed between the abutment member and the base of the recess to maintain the said abutment member and the opposed portion of the external surface of the casing in contact with the inner surface of the hollow rotary valve.

4. In an internal combustion engine, a hollow rotary valve to control the intake and exhaust of the engine, a casing non-rotatably mounted within the hollow rotary valve and transversely movable in the same, an induction conduit within the casing, intake passages disposed in line and extending from the induction conduit to the external surface of the casing, a recess in the casing positioned oppositely to the portion of said casing wherein are the intake passages, a roller in the recess, movable bearings supporting the roller, and springs interposed between the movable bearings and the base of the recess to maintain the roller and the opposed portion of the external surface of the casing in contact with the inner surface of the hollow rotary valve.

5. In an internal combustion engine, a cylinder unit, a hollow rotary valve controlling the intake and exhaust of the cylinder unit, a tubular intake non-rotatably mounted within the hollow rotary valve and transversely movable in the same, a supply passage for the cylinder unit in the tubular intake, inlet ports extending between the inner surface and the outer surface of the hollow rotary valve, resilient means urging the tubular intake into contact with the inner surface of the hollow rotary valve to seal the supply passages and the inner ends of the inlet ports, a seating on the cylinder unit fitting the outer surface of the hollow rotary valve, an opening in the seating communicating with the interior of the cylinder unit and connectible by the inlet ports with the supply passage, and resilient means thrusting the seating upon the external surface of the hollow rotary valve to seal the outer ends of the inlet ports.

6. In an internal combustion engine, a plurality of cylinder units, a hollow rotary valve common to the cylinder units and controlling the intake and exhaust of said units, a tubular intake non-rotatably mounted within the hollow rotary valve and transversely movable in the same, a supply passage for each cylinder unit in the tubular intake, inlet ports for each cylinder unit formed in the hollow rotary valve and extending from the inner surface to the outer surface of said valve, resilient means urging the tubular intake into contact with the inner surface of the hollow rotary valve to seal the supply passages and the inner ends of the inlet ports, seatings on the cylinder units fitting the outer surface of the hollow rotary valve, openings in the seatings communicating with the interior of the cylinder units and connectible by the inlet ports with the supply passages, and resilient means thrusting the seatings upon the external surface of the hollow rotary valve to seal the outer ends of the inlet ports.

7. In an internal combustion engine, cylinder units mounted for endwise movement, a hollow rotary valve common to the cylinder units, concave bearing surfaces formed on the ends of the endwise movable cylinder units and fitting the outer surface of the hollow rotary valve, service ports for the cylinder units in the concave bearing surfaces, an intake manifold non-rotatably mounted within the hollow rotary valve and transversely movable in said valve, intake passages extending from the intake manifold and alined with the service ports, inlet ports extending between the inner and the outer surfaces of the hollow rotary valve to establish communication between the intake passages and the service ports as said valve rotates, resilient means bearing on the transversely movable intake manifold to maintain the portion of said manifold wherein are the intake passages in contact with the inner surface of the hollow rotary valve, and resilient means bearing upon the endwise movable cylinder units to maintain the concave bearing surfaces in contact with the outer surface of the hollow rotary valve.

8. In an internal combustion engine, the combination of a cylinder unit with crankcase, a cylinder barrel in the cylinder unit mounted in fixed position with respect to said crankcase, a sleeve slidably fitting the exterior of the cylinder barrel, a closed end on the sleeve, a concave seating surface on the closed end of the sleeve, an opening in the concave seating surface communicating with the interior of the cylinder barrel, a rotary valve revolvable in contact with the concave seating surface, circumferentially alined inlet and exhaust ports formed in the rotary valve and connecting alternately with the opening in said concave seating surface as the said valve revolves, and resilient means bearing on the slidable sleeve to maintain the concave seating surface in fluid-tight contact with the hollow rotary valve.

9. In an internal combustion engine, the combination of, a plurality of endwise movable cylinder units positioned in contact and in linear arrangement, a hollow rotary valve common to the cylinder units, a crank chamber, apertures in the crank chamber, extensions of the cylinder units slidably fitting the apertures, an axial portion of the hollow rotary valve, opposed pairs of arcuate slides concentrically related to the axial cylindrical body and forming the outer portion of the hollow rotary valve, concave bearing surfaces formed on the ends of the endwise movable cylinder units and fitting the arcuate slides, service ports in the concave bearing surfaces communicating with the interiors of the cylinder units, an intake manifold non-rotatably mounted in the axial cylindrical body and transversely movable in the same, lateral passages formed in the intake manifold in alinement with the service ports, tubular inlet conduits formed integrally with the axial cylindrical body and with the arcuate slides and establishing communication with the lateral passages and the service ports as the rotary valve rotates, springs bearing upon the transversely movable intake manifold and urging the portion of the same wherein are the lateral passages into contact with the inner periphery of the cylindrical body, and springs interposed between the crank chamber and the endwise movable cylinder units.

10. In an internal combustion engine, the combination of, a hollow rotary valve controlling the intake and exhaust of the engine, a crank chamber, a cylinder barrel secured to the crank chamber in fixed position, a sleeve slidably fitting the exterior of the cylinder barrel, an axial cylindrical body forming the inner portion of the hollow rotary valve, a pair of diametrically opposed arcuate slides concentrically related to the axial cylindrical body and forming the outer portion of the hollow rotary valve, a closed end on said sleeve, a concave bearing surface formed on the sleeve and fitting the arcuate slides, a service port in the concave bearing surface communicating with the interior of the said cylinder barrel, a tubular intake non-rotatably mounted in the axial cylindrical body and transversely movable in the same, a lateral opening in the tubular intake in alinement with the service port, tubular inlet conduits formed integrally with the axial cylindrical body and with the arcuate slides and establishing communication with the lateral opening and the service port as the rotary valve revolves, springs bearing upon the transversely movable tubular intake and urging the portion of the same wherein is the lateral opening into contact with the inner periphery of the axial cylindrical body, springs interposed between the crank chamber and the said sleeve, and means for adjusting the compression of the latter springs.

11. In an internal combustion engine, the combination as claimed in claim 10, including, an exhaust space between the axial cylindrical body and the arcuate slides of the rotary valve, circumferential spaces between the ends of the opposed arcuate slides forming exhaust ports to establish communication between the service port and the exhaust space as the rotary valve revolves, a cover fitting the rotary valve, exhaust chambers adjoining the ends of the rotary valve and associated with the exhaust space, passages in the cover connecting the exhaust chambers, and exhaust outlets forming extensions of the passages.

HUGH STANLEY McLAREN.